United States Patent
Ishida

(10) Patent No.: US 6,212,410 B1
(45) Date of Patent: Apr. 3, 2001

(54) PORTABLE TELEPHONE APPARATUS WITH SECURITY FUNCTION

(75) Inventor: Takeshi Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/027,846

(22) Filed: Feb. 23, 1998

(30) Foreign Application Priority Data

Feb. 24, 1997 (JP) .................................... 9-039072

(51) Int. Cl.⁷ .................. H04B 7/00; H04B 1/38; H04M 1/00
(52) U.S. Cl. .............. 455/572; 455/573; 455/574; 455/575; 455/410; 455/572
(58) Field of Search .................. 455/572, 573, 455/575, 567, 410; 361/18; 320/110, 106

(56) References Cited

U.S. PATENT DOCUMENTS

| | | | | |
|---|---|---|---|---|
| 4,588,938 | * | 5/1986 | Liautaud et al. | 320/2 |
| 4,873,479 | * | 10/1989 | Iimura et al. | 320/2 |
| 4,955,049 | * | 9/1990 | Ghisler | 379/58 |
| 5,150,031 | * | 9/1992 | James et al. | 320/2 |
| 5,164,652 | * | 11/1992 | Johnson et al. | 320/2 |
| 5,455,863 | * | 10/1995 | Brown et al. | 380/23 |
| 5,467,007 | * | 11/1995 | Hyakutake | 320/22 |
| 5,555,551 | * | 9/1996 | Rudokas et al. | 379/59 |
| 5,771,448 | * | 6/1998 | Cooper | 455/411 |

FOREIGN PATENT DOCUMENTS

| | | | |
|---|---|---|---|
| 0266678 | | 5/1988 | (EP) . |
| 0 266 678 A2 | * | 5/1988 | (EP) . |
| 2320397 | | 6/1998 | (GB) . |
| 4-271646 | * | 9/1992 | (JP) ................ H04M/1/00 |
| 9723986 | | 7/1997 | (WO) . |

* cited by examiner

Primary Examiner—Thanh Cong Le
Assistant Examiner—Meless Zewdu
(74) Attorney, Agent, or Firm—Ostrolenk, Faber, Gerb & Soffen, LLP

(57) ABSTRACT

A portable telephone apparatus with a security function includes a first detecting and processing circuit for determining whether or not identification information of a portable telephone main unit and identification information of a battery unit that supplies power to the portable telephone main unit match, and for supplying the power to the portable telephone main unit when the identification information of the portable telephone main unit and the identification information of the battery unit match. The portable telephone apparatus also includes a second detecting and processing circuit for determining whether or not identification information of the battery unit for use with the portable telephone main unit and identification information of a battery charger that charges the battery unit match, and for causing the battery charger to supply power to the battery unit when the identification information of the battery unit and the identification information of the battery charger match. When identification information of the portable telephone main unit, the battery unit, and the battery charger match, the power to the portable telephone main unit is turned on and thereby the battery unit is charged.

18 Claims, 9 Drawing Sheets

CONNECTIONS OF PORTABLE TELEPHONE MAIN UNIT AND BATTERY UNIT

FIG. 2 CONNECTIONS OF BATTERY CHARGER AND BATTERY UNIT

RELATION BETWEEN BUILT-IN BATTERY TYPE PORTABLE TELEPHONE MAIN UNIT AND BATTERY CHARGER

RELATION BETWEEN PORTABLE TELEPHONE UNIT WITH CHARGING FUNCTION AND BATTERY UNIT

PROCESS OF PORTABLE TELEPHONE MAIN UNIT

PROCESS OF BATTERY CHARGER

PORTABLE TELEPHONE APPARATUS WITH SECURITY FUNCTION

BACKGROUND OF THE INVENTION

1. Field of the Invention

The present invention relates to a portable telephone apparatus of mobile communication type, in particular, to a portable telephone apparatus with a security function for preventing power from being supplied in the event that the apparatus has been stolen.

2. Description of the Related Art

Conventionally, when a portable telephone unit has been mislaid or stolen, it can be freely used by a person who found or stole it unless the owner asks the operator company for the to invalidate the telephone unit. To prevent such a problem, a dial-lock function has been used. The dial-lock function serves to prevent a person other than the owner of the portable telephone unit to make a call. As a related art reference of the dial-lock function, Japanese Patent Examined Publication 64-3414 entitled "Dial-lock Apparatus for Car Telephone unit" has been disclosed. With the dial-lock apparatus according to the related art reference, when the user performs a simple switch operation, the telephone unit enters a dial-lock state in which he or she can receive a call, but can not make a call. The dial-lock state cannot be canceled unless the user enters a predetermined password. When the battery of the telephone unit is dismounted and then mounted, the telephone unit enters the dial-lock state again. Thus, even if the telephone unit is stolen, it can be prevented from being freely used.

In Japanese Patent Laid-Open Publication No. 4-271646, another related art reference has been disclosed. In this related art reference, identification information has been assigned to a pair of a battery charger and a cordless telephone main unit. When another cordless telephone unit is mounted on a particular battery charger, an alarm is generated. When a cordless telephone unit is used, if it does not have a parent-child relation with the particular telephone main unit, the cordless telephone unit is prohibited from being used. However, in this related art reference, the technology by which identification information is assigned to a battery has not been disclosed.

However, a first problem with the above-described related art references is that the user of a portable telephone unit does not always use the dial-lock function.

In other words, to make a call, the user of the portable telephone unit should deactivate the dial-lock function. In addition, after the user has completed the call, he or she sometimes forgets to reactivate the dial-lock function.

A second problem with the above-described related art reference is that the user tends not to use the dial-lock function.

In other words, unless the user carefully reads the manual of the portable telephone unit, he or she does not know how to use the dial-lock function.

A third problem with the related art references is that if the portable telephone unit is stolen in the state in which the dial-lock function has not been turned on, the owner must ask the operator company to invalidate of the registered ID number of the stolen portable telephone unit to prevent the stolen units from being.

In other words, if the portable telephone unit has been stolen and the user is not aware that it was stolen, the thief can freely use it.

SUMMARY OF THE INVENTION

An object of the present invention is to secure a portable telephone unit without the need to activate a security function. Another object of the present invention is to further secure a portable telephone unit with a conventional dial-lock function.

A first aspect of the present invention is a portable telephone apparatus with a security function, comprising a detecting and processing means for determining whether or not identification information of a portable telephone main unit and identification information of a battery unit that supplies power to the portable telephone main unit match and for supplying power to the portable telephone main unit when the identification information of the portable telephone main unit and the identification information of the battery unit match.

A second aspect of the present invention is a portable telephone apparatus with a security function, comprising a detecting and processing means for determining whether or not identification information of a battery unit for use with a portable telephone main unit and identification information of a battery charger that charges the battery unit match and for causing the battery charger to supply the power to battery unit when the identification information of the battery unit and the identification information of the battery charger match.

A third aspect of the present invention is a portable telephone apparatus with a security function, comprising a first detecting and processing means for determining whether or not identification information of a portable telephone main unit and identification information of a battery unit that supplies power to the portable telephone main unit match and for supplying power to the portable telephone main unit when the identification information of the portable telephone main unit and the identification information of the battery unit match, and a second detecting and processing means for determining whether or not identification information of the battery unit for use with the portable telephone main unit and identification information of a battery charger that charges the battery unit match and for causing the battery charger to supply the power to battery unit when the identification information of the battery unit and is the identification information of the battery charger match.

A fourth aspect of the present invention is a portable telephone apparatus with a portable telephone main unit and/or a battery charger, and a rechargeable battery unit having identification information which indicates that the portable telephone main unit and/or the battery charger, and the battery unit are structured as a set, wherein the battery unit has a means for allowing the battery unit to supply a charging current to the portable telephone main unit or for allowing the battery charger to supply a charging current to the battery unit corresponding to a start signal that is received from the portable telephone main unit or the battery charger when the identification information of the portable telephone main unit or the battery charger and the identification information of the battery unit match.

The match of the identification information occurs upon the match of designated numbers stored in respective memories of the portable telephone main unit and/or the battery charger, and the battery unit.

In the portable telephone apparatus with the security function according to the present invention, only when the designated numbers of the portable telephone main unit and the battery unit that supplies power thereto match, power of the portable telephone main unit is turned on. When another battery unit of the same type is mounted to the portable telephone main unit, power to the main unit is not turned on.

In addition, another function is provided used when the battery unit is charged. Unless the designated numbers of the battery unit and the battery charger match, the battery charger is prohibited from charging the battery unit.

In reality, referring to FIG. 1, the main unit has a battery unit detecting circuit A (14), a storing memory A (16), a comparing circuit A (15), and a start signal sending circuit A (17). The battery unit detecting circuit A (14) detects whether or not the battery unit has been mounted. The storing memory A (16) stores a designated number. The comparing circuit A (15) compares designated numbers. The start signal sending circuit A (17) sends a start signal that causes the battery unit to supply power to the main unit.

In addition, the battery unit has a secondary battery (32), a main unit detecting circuit (34), a storing memory B (36), a designated number sending circuit (35), and a switch B (37). The secondary battery (32) is a rechargeable battery and supplies power to the portable telephone main unit. The main unit detecting circuit (34) detects the main unit. The storing memory B (36) stores a designated number. The designated number sending circuit (35) sends the designated number. The switch B (37) controls the supply from the power of secondary battery.

Referring to FIG. 2, the battery charger has a battery unit detecting circuit C (54), a storing memory C (56), a comparing circuit C (55), and a start signal sending circuit C (57). The battery unit detecting circuit C (54) detects whether or not the battery unit has been mounted. The storing memory C (56) stores a designated number [3]. The comparing circuit C (55) compares a designated number [2] of the battery unit and the designated number [3]. The start signal sending circuit C (57) sends a start signal to the switch B which causes the battery unit to be charged.

The power of the portable telephone unit with the security function according to the present invention is turned on only when identification information such as a designated number of the main unit matches that of the battery unit (or a predetermined condition of the main unit matches that of the battery unit). Thus, even if another battery unit of the same type is mounted to the telephone unit, the power of portable telephone unit is not turned on. In addition, unless identification information such as a designated number of the battery unit matches that of the battery charger, the battery charger does not charge the battery unit.

According to the portable telephone unit with the security function according to the present invention, whenever the battery unit is mounted to the telephone main unit or the battery charger, the security check is performed. Thus, the portable telephone unit is secured without the need to set a security function.

Normally, when a portable telephone unit is stolen, a battery unit has been mounted to the main unit. Thus, according to the present invention, even if a portable telephone unit in which a dial-lock function has been activated is stolen, the telephone unit cannot be used after the power of the battery unit runs out. In addition, due to a security check, the battery unit cannot be charged with another battery charger of the same type. Thus, the loss of the user can be minimized.

In addition, even if the battery unit of the portable. telephone main unit is replaced with another battery unit, if the identification information of the replaced battery unit does not match that of the battery charger, the battery unit does not supply power to the main unit. In the case that identification information has been assigned to only a portable telephone main unit and a battery charger, if a battery unit of the same type that has been charged is mounted to the main unit, the portable telephone can still be used. However, according to the present invention, since this method is invalidated, much higher security can be accomplished.

In other words, according to the present invention, the battery unit has a designated number. In addition, the battery unit has a power line open/close switch (37) that causes the secondary battery to be opened and closed. Thus, the battery unit has a controlling means that does not connect the power line of the battery unit unless the start signal which indicates that identification information of the main unit or the battery charger matches that of the battery unit is received. Thus, power is not supplied to the portable telephone main unit. Current from of the battery charger is not supplied to the secondary battery. Thus, the battery unit is not charged.

Consequently, another battery charger of the same type cannot be used. In addition, another battery unit of the same type cannot be used. Thus, a much higher security function can be achieved.

These and other objects, features and advantages of the present invention will become more apparent in light of the following detailed description of the preferred embodiments thereof, as illustrated in the accompanying drawings.

DESCRIPTION OF THE PREFERRED EMBODIMENTS (1) Description of the Structure

Next, with reference to the accompanying drawings, embodiments of the present invention will be described.

Figure 1:
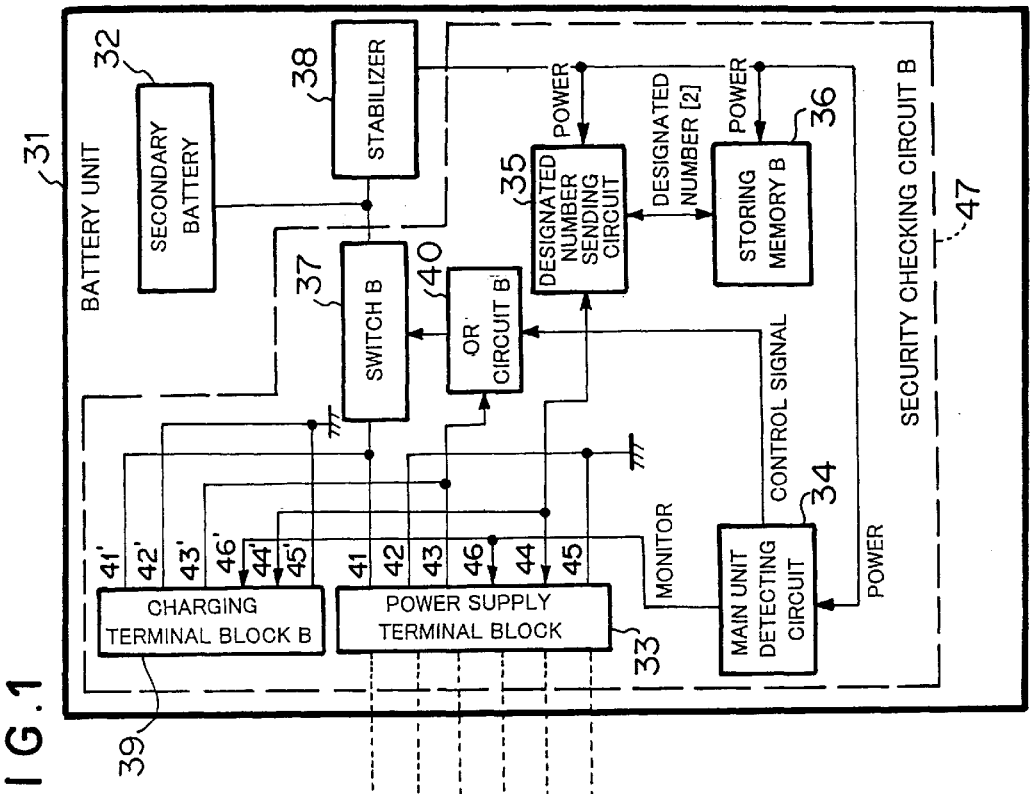
FIG. 1 is a block diagram showing the structures and connections of a portable telephone main unit and a battery unit according to an embodiment of the present invention.

FIG. 1 is a block diagram showing the structures of a portable telephone main unit and a battery unit in a state in which the battery unit has been mounted to the portable telephone main unit.

Figure 2:
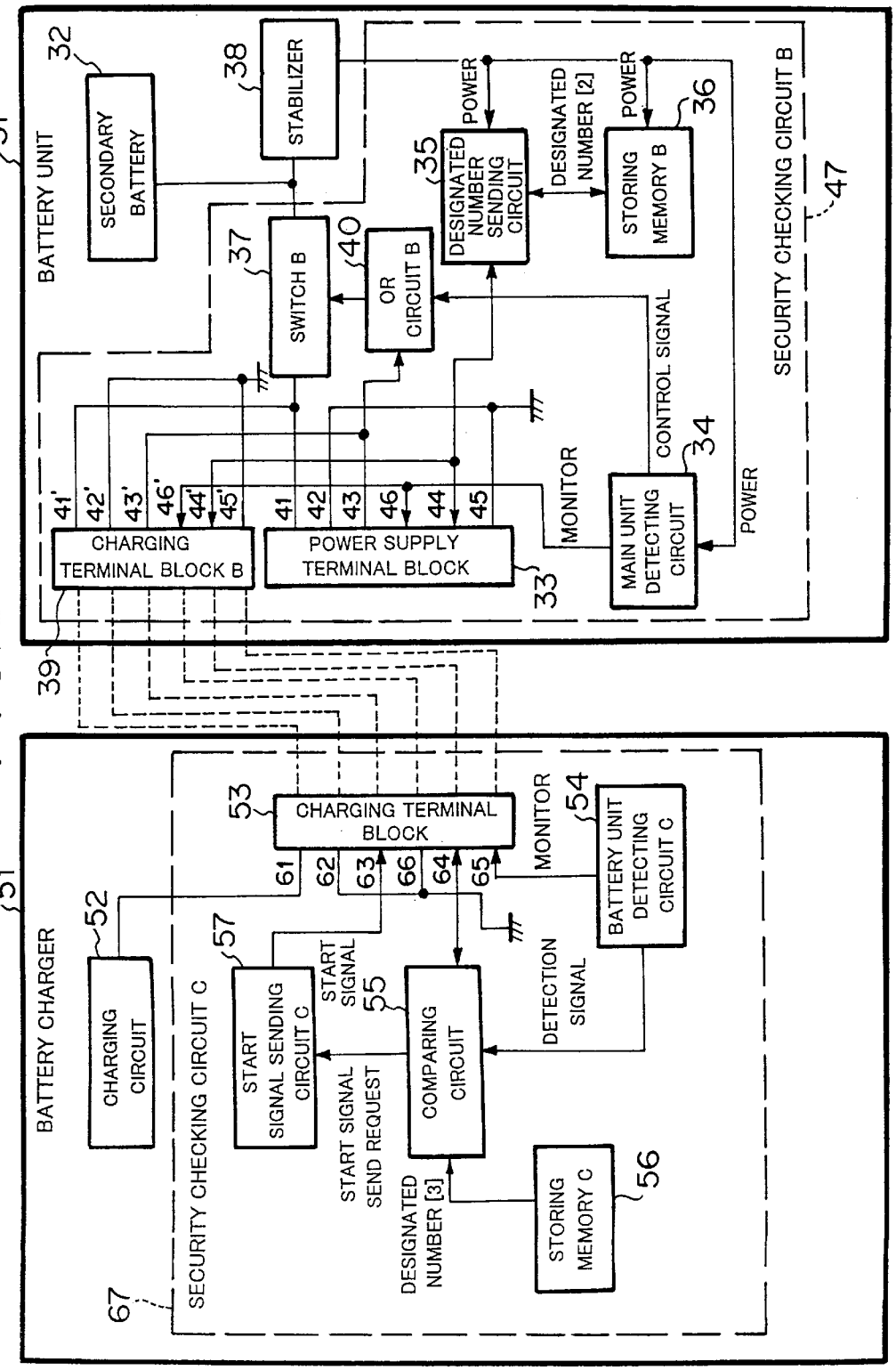
FIG. 2 is a block diagram showing the structures and connections of a battery charger and a battery unit according to an embodiment of the present invention.

FIG. 2 is a block diagram showing the structures of a battery charger and a battery unit in the state in which a battery unit has been mounted to the battery charger.

Referring to FIG. 1, a portable telephone main unit (hereinafter referred to as the main unit) (11) comprises a power supply (12), a battery unit detecting circuit A (14), a storing memory A (16), a comparing circuit A (15), a start signal sending circuit A (17), an OR circuit A (20), a battery terminal block (13), a backup battery (18), and a switch A (19). The power supply (12) supplies power to each portion (such as ICs) of the main unit (11). The battery unit detecting circuit A (14) detects whether or not a battery unit (31) has been mounted to the main unit (11). The battery unit (31) supplies power to the main unit (11). The backup battery (18) always supplies power to the battery unit detecting circuit A (14). The storing memory A (16) stores a designated number [1]. The comparing circuit A (15) compares a designated number [2] of the battery unit (31) and the designated number [1] stored in the storing memory A (16). The start signal sending circuit A (17) sends to a switch B (37) a signal that causes power to be supplied to the main unit (11). The OR circuit A (20) performs an OR operation between an output signal of the comparing circuit A (15) and a control signal received from the battery unit detecting circuit A (14). The battery terminal block (13) receives power from the battery unit (31) when the battery unit (31) is mounted to the main unit (11). In addition, the battery terminal block (13) functions as an interface (hereinafter referred to as the I/F) that exchanges data. The backup battery (18) supplies power to the above-described portions (the battery unit detecting circuit A, the storing memory A, the comparing circuit A, the start signal sending circuit A, the OR circuit A, and the battery terminal block, collectively referred to as the security checking circuit A (27)) while power is not being supplied to the main unit (11) from the battery unit 31. The switch A (19) turns on/off the supply of power to the backup battery (18).

The battery unit (31) stores electric charge for delivering a current to the main unit (11). The battery unit (31) comprises a secondary battery (32), a main unit detecting circuit (34), a storing memory B (36), a designated number sending circuit (35), a switch B (37), an OR circuit B (40), a power supply terminal block (33), a charging terminal block B (39), and a stabilizer (38). The secondary battery (32) is a rechargeable battery. The main unit detecting circuit (34) detects whether or not the battery unit (31) has been mounted to the main unit (11). The storing memory B (36) stores a designated number [2]. The designated number sending circuit (35) sends the designated number [2] stored in the storing memory B (36) to the main unit (11). The switch B (37) turns on/off the supply of the power from the secondary battery (32) to the main unit (11). The OR circuit B (40) performs an OR operation between the start signal received from the start signal sending circuit A (17) and a control signal received from the main unit detecting circuit (34). The power supply terminal block (33) supplies power and functions as an I/F for exchanging data. The charging terminal block B (39) has terminals corresponding to those of the power supply terminal block (33). The stabilizer (38) stably supplies power to the above-described portions of the battery unit (31). The main unit detecting circuit, the storing memory B, the designated number sending circuit, the switch B, the OR circuit B, the power supply terminal block, and the charging terminal block are collectively referred to as a security checking circuit B (47).

Referring to FIG. 2, the battery charger (51) comprises a charging circuit (52), a battery unit detecting circuit C (54), a storing memory C (56), a comparing circuit C (55), a start signal sending circuit C (57), and a charging terminal block (53). The charging circuit (52) is connected to an AC power line and supplies a DC voltage. The battery unit detecting circuit C (54) detects whether or not the battery unit (31) has been mounted to the battery charger (51). The storing memory C (56) stores a designated number [3]. The comparing circuit C (55) compares the designated number [2] of the battery unit (31) and the designated number [3] stored in the storing memory C (56). The start signal sending circuit C (57) sends to the switch B 37 a signal that causes the battery charger (51) to start charging the battery unit (31). The charging terminal block (53) serves to charge the battery unit (31) when the battery unit (31) is mounted to the battery charger (51). In addition, the charging terminal block (53) functions as an I/F for exchanging data. The battery unit detecting circuit C, the storing memory C, the start signal sending circuit C, the comparing circuit C, and the charging terminal block are collectively referred to as the security checking circuit C (67).

In FIG. 1, a radio unit composed of a radio frequency amplifier, a mixer, a synthesizer, a modem, and so forth, a controlling circuit for processing an audio signal and a control signal for a speaker and a microphone, and a power supply for the battery charger (51) that is connected to an AC power line and supplies a DC voltage are all omitted therefrom in order to simplify the drawing to facilitate the description of the invention.

Figure 3:
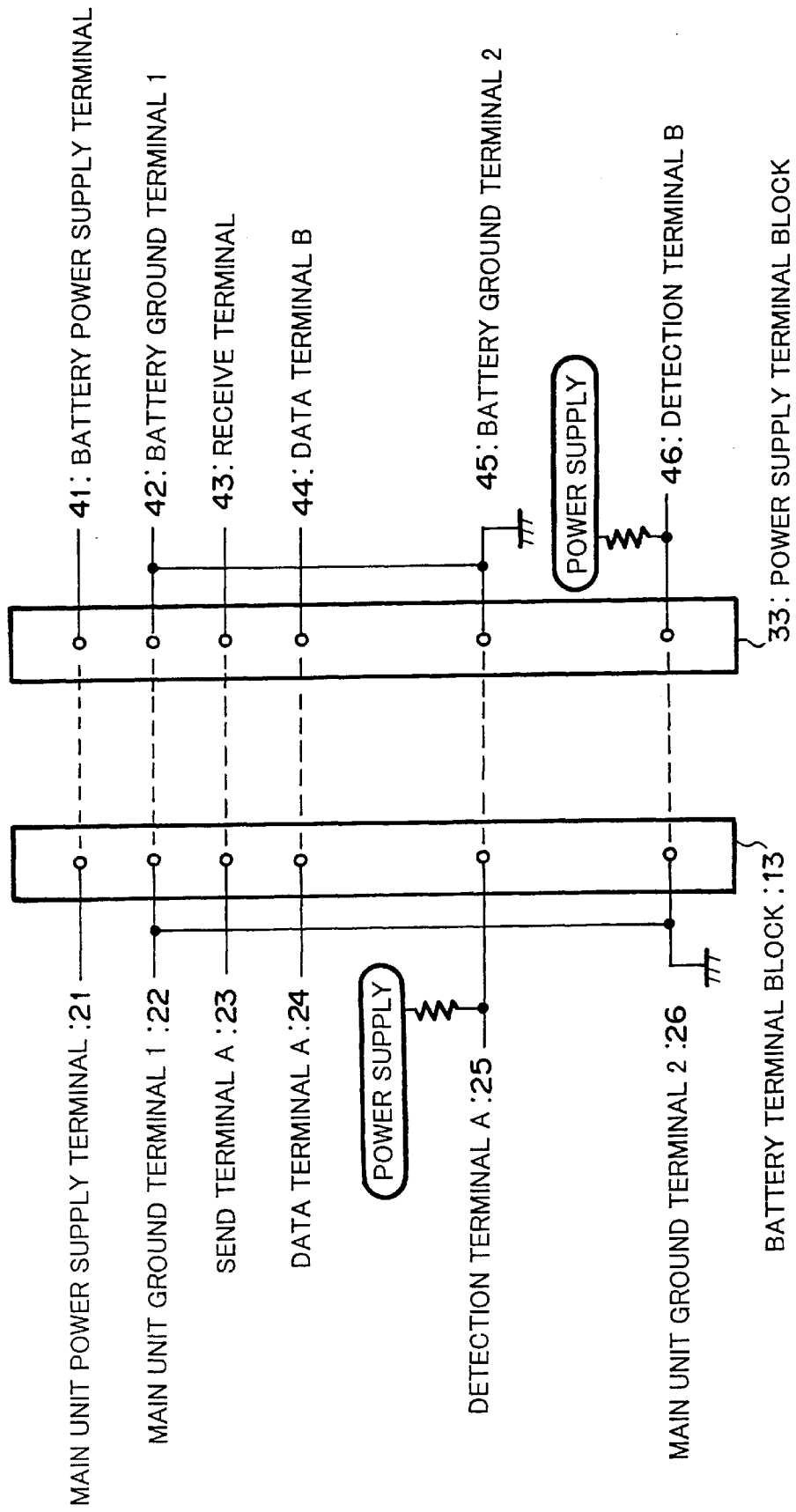
FIG. 3 is a schematic diagram showing the structures of a battery terminal block of the portable telephone main unit according to the present invention and a power supply terminal block of the battery unit thereof.

Next, with reference to FIG. 3, the structure of the battery terminal block (13) will be described. Referring to FIG. 3, the battery terminal block (13) comprises a main unit power supply terminal (21), a main unit ground terminal 2 (26), a detection terminal A (25), a send terminal A (23), and a data terminal A (24). The main unit power supply terminal (21) receives power to the main unit (11). The main unit ground terminal 2 (26) varies the logic value of the main unit detection signal line for the battery unit (31) when the battery unit (31) is mounted. The ion logic level of the detection terminal A (25) varies between "0" and "1" when the battery unit (31) is mounted. The send terminal A (23) sends a start signal. The data terminal A (24) sends a designated number send request and receives a designated number.

In addition, referring to FIG. 3, the power supply terminal block (33) comprises a battery power supply terminal (41), a battery ground terminal 1 (42), a battery ground terminal 2 (45), a detection terminal B (46), a receive terminal (43), and a data terminal B (44). The battery power supply terminal (41) supplies power to the main unit (11). The battery ground terminal 2 (45) varies the logic value of the battery detection signal line for the main unit (11). The logic value of the detection terminal B (46) varies when the battery unit (31) is mounted to the main unit or the battery charger. The receive terminal (43) receives the start signal from the main unit or the battery charger. The data terminal B (44) receives a designated number send request or sends a designated number.

Figure 4:
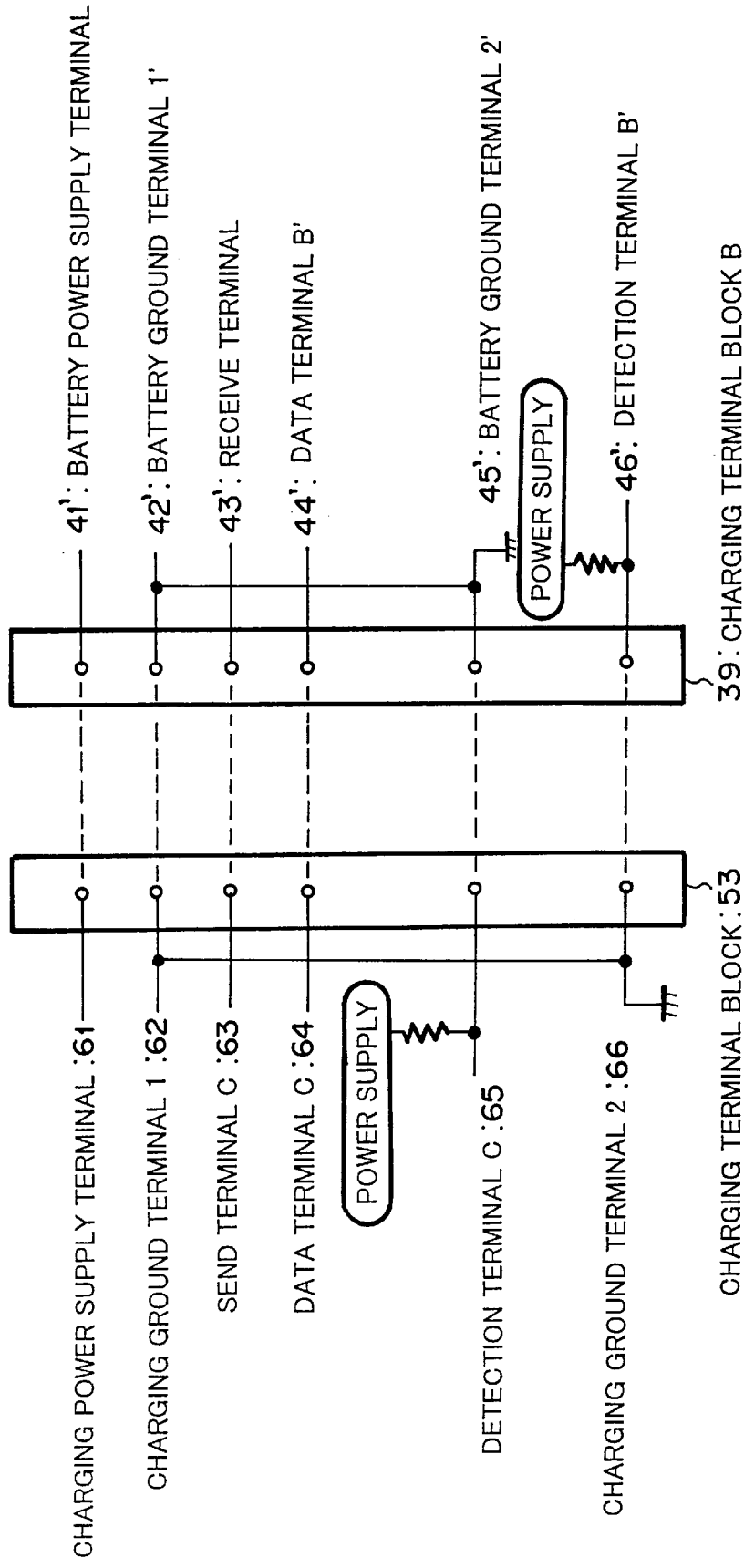
FIG. 4 is a schematic diagram showing the structures of a charging terminal block of the battery charger according to the present invention and a charging terminal block B of the battery unit thereof.

As shown in FIG. 4, the power supply terminal block (33) has terminals corresponding to those of the charging terminal block B (39).

Referring to FIG. 4, the charging terminal block (53) comprises a charging power supply terminal (61), a charging ground terminal 1 (62), a charging ground terminal 2 (66), a detection terminal C (65), a send terminal C (63), and a data terminal C (64). The charging power supply terminal (61) and the charging ground terminal 1 (62) charge the battery unit (31). The charging ground terminal 2 (66) varies the logic value of a battery charger detection signal line for the battery unit (31) when the battery unit (31) is mounted. The logic value of the detection terminal C (65) varies when the battery unit is mounted. The data terminal C (64) sends a designated number send request and receives a designated number.

Returning to FIG. 1, the comparing circuit A (15) that sends a designated number send request, compares designated numbers, and sends a start signal send request is composed of a CPU (Central Processing Unit). In this embodiment, the battery unit detecting circuit A (14), the start signal sending circuit A (17), and so forth are structured as separate circuits. However, these circuits may be structured as one CPU. The structure of the comparing circuit C (55) is the same as the structure of the comparing circuit A (15).

The start signal sending circuit A (17) sends a control signal (composed of for example, two pulses) to the switch B (37) of the battery unit (31) through the OR circuit B (40) corresponding to the start signal send request received from the comparing circuit A (15) so as to control the switch B (37). The structure of the start signal sending circuit C (57) of the battery charger (51) is the same as the structure of the start signal sending circuit A (17).

The designated number sending circuit (35) that exchanges signals received from the data terminal B (44), stores the designated number [2] to the storing memory (36), receives a designated number send request from the comparing circuit A (15) or the comparing circuit C (55), and sends the designated number [2] stored in the storing memory B (36) is composed of a CPU or a gate array.

The main unit (11), the battery unit (31), and the battery charger (51) have respective storing memories (for example, SRAMs or EEPROMs) that store the designated numbers [1], [2], and [3], respectively. The designated numbers [1], [2], and [3] vary corresponding to a set of the main unit, battery unit, and battery charger.

The designated numbers stored in the storing memories A, B, and C control the CPUs of the comparing circuit A (15) and the comparing circuit C (55) from the data terminal A (24) of the battery terminal block (13) and the data terminal C (64) of the charging terminal block (53) through a transfer terminal block (not shown) so that the main unit (11) and the battery charger (51) transfer the designated numbers [1] and [2] to the storing memories A (16) and C (56), respectively. The designated numbers stored in the storing memories A, B, and C control the CPU of the designated number sending circuit (35) so that the battery unit (31) transfers the designated number [2] to the storing memory B (36) through the data terminal B (44) of the power supply terminal block (33).

(2) Description of Operation

Next, with reference to FIGS. 1 and 3, the operation of an embodiment of the present invention will be described.

When the battery unit (31) is mounted to the main unit (11), since the detection terminal A (25) of the battery terminal block (13) of the portable telephone main unit (11) is connected to the battery ground terminal 2 (45), the logic value varies from "1" to "0" (where "1" represents the voltage level; and "0" represents the GND level). Thus, when the battery unit detecting circuit A (14) (which always receives power from the backup battery (18)) detects that the battery unit (31) is mounted to the main unit (11), the battery unit detecting circuit A (14) outputs a control signal that controls the switch A (19) through the OR circuit A (20) (which also always receives power from the backup battery (18)) so as to supply power from the backup battery (18) to the security checking circuit A (27). Thus, the security checking circuit A (27) operates.

Thereafter, the battery unit detecting circuit A (14) sends a battery detection signal to the comparing circuit A (15). At this point, as with the main unit (11), the detection terminal B (46) of the battery unit (31) is connected to the main unit ground terminal 2 (26). Thus, the logic value varies. Consequently, the main unit detecting circuit (34) causes the switch B (37) to open through the OR circuit B (40) and thereby sends a signal that causes the secondary battery (32) to stop supplying power. Thus, power is not supplied to the power supply (12) of the main unit (11). Furthermore power is not supplied to the sending/receiving units and speaker/microphone of the main unit (11).

Corresponding to the battery detection signal, the comparing circuit A (15) sends a request for the designated number [2] to the designated number sending circuit (35) of the battery unit (31) through the data terminal A (24) and the data terminal B (44). Corresponding to the send request, the designated number sending circuit (35) sends the designated number [2] stored in the storing memory B (36) to the comparing circuit A (15) to the comparing circuit A (15) through the data terminal B (44). The comparing circuit A (15) compares the received designated number [2] with the designated number [1] stored in the storing memory A (16). When they match, the comparing circuit A (15) informs the start signal sending circuit A (17) between the match of these designated numbers.

Corresponding to the start signal send request, the start signal sending circuit A (17) sends a start signal (composed of, for example, two pulses) from the send terminal A (23) to the switch B (37) through the receive terminal (43) and the OR circuit B (40). Corresponding to the start signal, the switch B (37) closes the power line. Thus, power from the secondary battery (32) is supplied to the power supply (12) of the main unit (11) through the battery power supply terminal (41) and the main unit power supply terminal (21). When the start signal is composed of two to four pulses rather than one pulse, it becomes difficult to forge the start signal. Thus, the portable telephone unit can be prevented from being illegally used.

When the comparing circuit A (15) compares designated numbers, if they do not match, since the comparing circuit A (15) does not send a start signal send request, the start signal is not sent to the OR circuit B (4) that controls the switch B (37). Thus, since the switch B (37) is not closed, the battery unit (31) does not supply power to the main unit (11). In addition, the comparing circuit A (15) sends to the switch A (19) through the OR circuit A (20) a signal that causes the switch A (19) to open and disconnect the backup battery (18). Consequently, when the battery unit (31) does not supply power to the main unit (11) and it is not necessary to operate the security checking circuit A (27), the current consumption of the backup battery (18) can be suppressed. Thus, the backup battery (18) supplies power to only the battery unit detecting circuit A (14) and the OR circuit A (20). Consequently, the backup battery (18) can operate for more than two years. Alternatively, the backup battery (18) may be a capacitor with a large capacity. In this case, only when the battery unit (31) is connected, the secondary battery (32) charges the backup battery (18) through the battery terminal. Thus, since the operation of the backup battery (18) is always assured, it is not necessary to manage the remaining capacity of the backup battery (18).

Next, with reference to FIGS. 2 and 4, an embodiment of the present invention in which the battery unit (31) is mounted to the battery charger (51) will be described.

When the battery unit (31) is mounted to the battery charger (51), since the detection terminal C (65) of the charging terminal block (53) is connected to the battery ground terminal 2' (45'), the logic value varies from the power supply voltage to the designated voltage. Thus, the battery unit detecting circuit C (54) detects that the battery unit (31) has been mounted to the battery charger (51) and sends a detection signal to the comparing circuit C (55). In addition, as with the battery charger (51), since the detection terminal B' (46') of the battery unit (31) is connected to the charging ground terminal 2 (66), the logic value of the detection terminal B' (46') varies. Thus, the main unit detecting circuit (34) causes the switch B (37) to open through the OR circuit B (40) and sends a signal that causes the battery charger (51) to stop supplying power to the secondary battery (32).

The comparing circuit C (55) sends a send request for the designated number [2] to the designated number sending circuit (35) through the data terminal C (64) and the data terminal B' (44').

Corresponding to the send request, the designated number sending circuit (35) sends the designated number [2] stored in the storing memory B (36) to the comparing circuit C (55) through the data terminal B' (44'). The comparing circuit C (55) compares the designated number [2] received from the designated number sending circuit (35) and the designated number [3] stored in the storing memory C (56). When they match, the comparing circuit C (55) sends a start signal send request to the start signal sending circuit C (57).

The start signal sending circuit C (57) sends to the switch B (37) through the send terminal C (63) a signal (composed of, for example, two pulses) that causes the switch B (37) to be closed. Corresponding to the signal, the switch B (37) closes the power line. Thus, a charging current is supplied to the power line through the charging power supply terminal (61) and the battery power supply terminal (41)'. Consequently, the secondary battery (32) can be charged. In other words, the charging circuit (52) outputs a constant voltage or a constant current corresponding to an AC voltage so as to charge the secondary battery (32). At this point, when an overcharge protecting circuit that detects the charging state and prevents the battery unit from being overcharged is provided excessive power consumption is suppressed and the safety of the battery charger is improved.

When the comparing circuit C (55) compares designated numbers, if they do not match, the comparing circuit C (55) does not send the start signal send request to the switch B (37). Since the switch B (37) is not closed, the charging current does not supply power to the secondary battery (32). Thus, the secondary battery (32) cannot be charged. Consequently, after the power of the secondary battery (32) runs out, the portable telephone main unit cannot be used.

Second Embodiment

Figure 5:
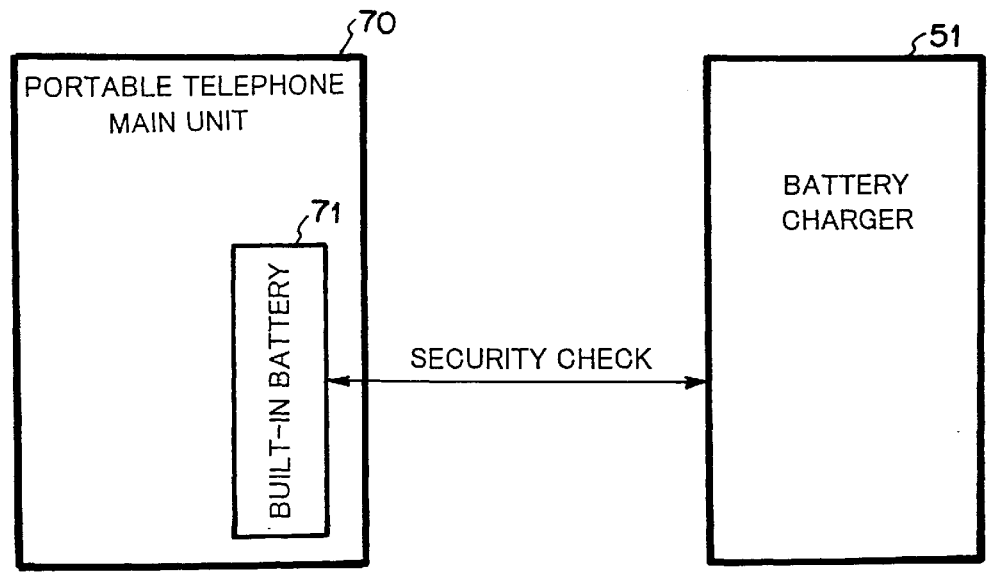
FIG. 5 is a schematic diagram showing the relation between a built-in battery type portable telephone main unit and a battery charger according to a second embodiment of the present invention.

With reference to FIG. 5, a second embodiment of the present invention will be briefly described.

In the case of a portable telephone unit with a built-in battery (71), a security check is performed between the built-in battery (71) that has the same function as the battery unit (31) of the first embodiment and the battery charger (51) of the first embodiment in the same manner as that of the first embodiment. Thus, when designated numbers do not match, the built-in battery (71) is not charged, and security is assured. In the second embodiment, a security check between the main unit (70) and the built-in battery (71) is not required due to the structure thereof. According to the second embodiment, when the designated number of the portable telephone main unit does not match the designated number of the battery charger, even if the portable telephone unit is stolen and is illegally used, it cannot be used after the power to the built-in battery runs out. Thus, the loss of the user can be minimized. in this case, although the portable telephone main unit and the battery charger are structured as a pair, when a plurality of designated numbers of a corresponding plurality of battery chargers have been stored in the storing memory C, if one pair of designated numbers match, the built-in battery is charged. Thus, the portable telephone main unit can be conveniently used. In addition, security can be assured as with the case in which the designated numbers of the portable telephone main unit and the battery charger are structured as a pair. The advantage of the second embodiment can be applied to the first embodiment when the charger has a plurality of designated numbers. Thus, in this case, a plurality of battery units can be used for one battery charger.

Third Embodiment

Figure 6:
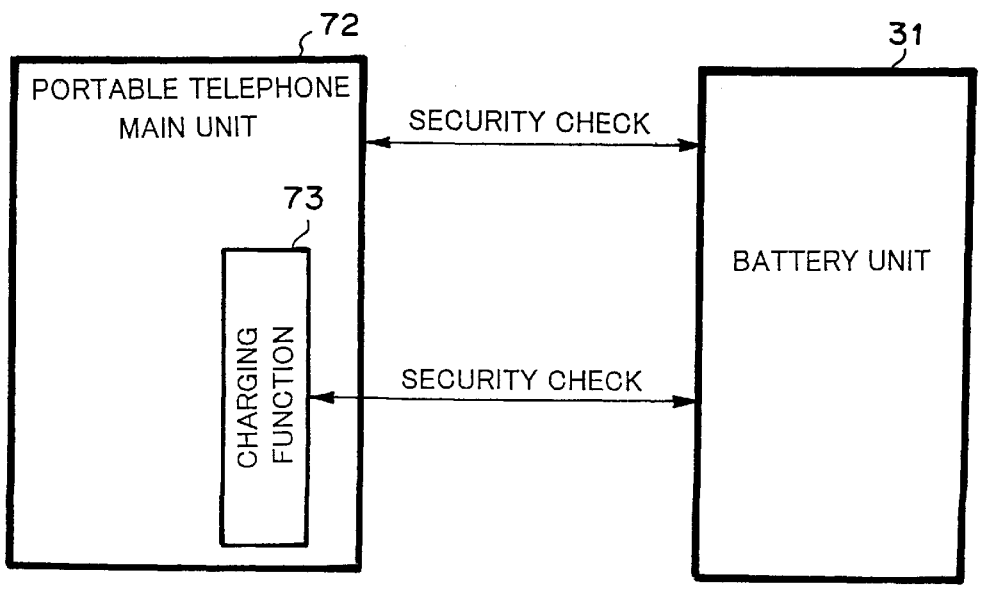
FIG. 6 is a schematic diagram showing the relation between a rechargeable portable telephone main unit and a battery unit according to a third embodiment of the present invention.

Next, with reference to FIG. 6, a third embodiment of the present invention will be briefly described. In the case of a portable telephone unit having a charging function (73), a security check between a main unit (72) with the same function as the main unit (11) described in the first embodiment and a battery unit (31) and a security check between a charging function (73) with the same function as the battery charger (71) of the first embodiment and the battery unit (31) are performed in the same manner as in the first embodiment. In this case, whenever the battery unit (31) is mounted to the main unit (72), the security check between the main unit (72) and the battery unit (31) and the security check between the charging function (73) and the battery unit (31) are performed. Thus, as with the first embodiment, security can be assured. In this case, as with the second embodiment, although the portable telephone main unit and the battery unit are structured as a pair, when the storing memory A stores a plurality of designated numbers of a corresponding plurality of battery units, if one of the designated numbers of the plurality of battery units matches with the designated number of the portable telephone main unit, the charging function 73 charges the relevant battery. Thus, a plurality of battery units can be used for one portable telephone main unit. Consequently, the portable telephone main unit can be conveniently used. In addition, the security of the third embodiment is assured as with the case in which the portable telephone unit and the battery are structured as a pair. This advantage can be applied to the first embodiment. In other words, when each portable telephone unit has a plurality of designated numbers corresponding to a plurality of battery units, a plurality of batteries can be used for one portable telephone unit.

Fourth Embodiment

As a forth embodiment of the present invention, a structure in which a stop signal is sent is available. Corresponding to the start signal sending circuit A (17) of the portable telephone main unit (11) shown in FIG. 1, a stop signal sending circuit A is disposed. When the dedicated numbers match in the comparing circuit A (15), the start signal sending circuit A (17) is selected. When the dedicated numbers do not match, the stop signal sending circuit A is selected. The stop signal sending circuit A outputs, for example, one pulse to the OR circuit B through the send terminal A (23). When the signal level of the OR circuit B is low for example, the switch B (37) is kept in the OFF state. In this case, the start signal sending circuit A (17) may provide the function of sending a stop signal.

In addition, the battery charger (51) may include structure for sending a stop signal. Corresponding to the start signal sending circuit C (57) of the battery charger (51) shown in FIG. 2, a stop signal sending circuit C is disposed. When designated numbers match in the comparing circuit C (55), the start signal sending circuit C (57) is selected. When the designated signals do not match, the stop signal sending circuit C is selected. In this case, the stop signal sending circuit C outputs, for example, one pulse to the OR circuit B (40) through the send terminal C (63). Thus, the switch B (37) is kept in the OFF state and thereby the battery unit is prohibited from being charged. In this case, the start signal sending circuit C (57) may provide the function of sending a stop signal.

Next, examples of the operations of the portable telephone unit, the battery unit, and the battery charger according to the fourth embodiment of the present invention will be described.

Figure 7:
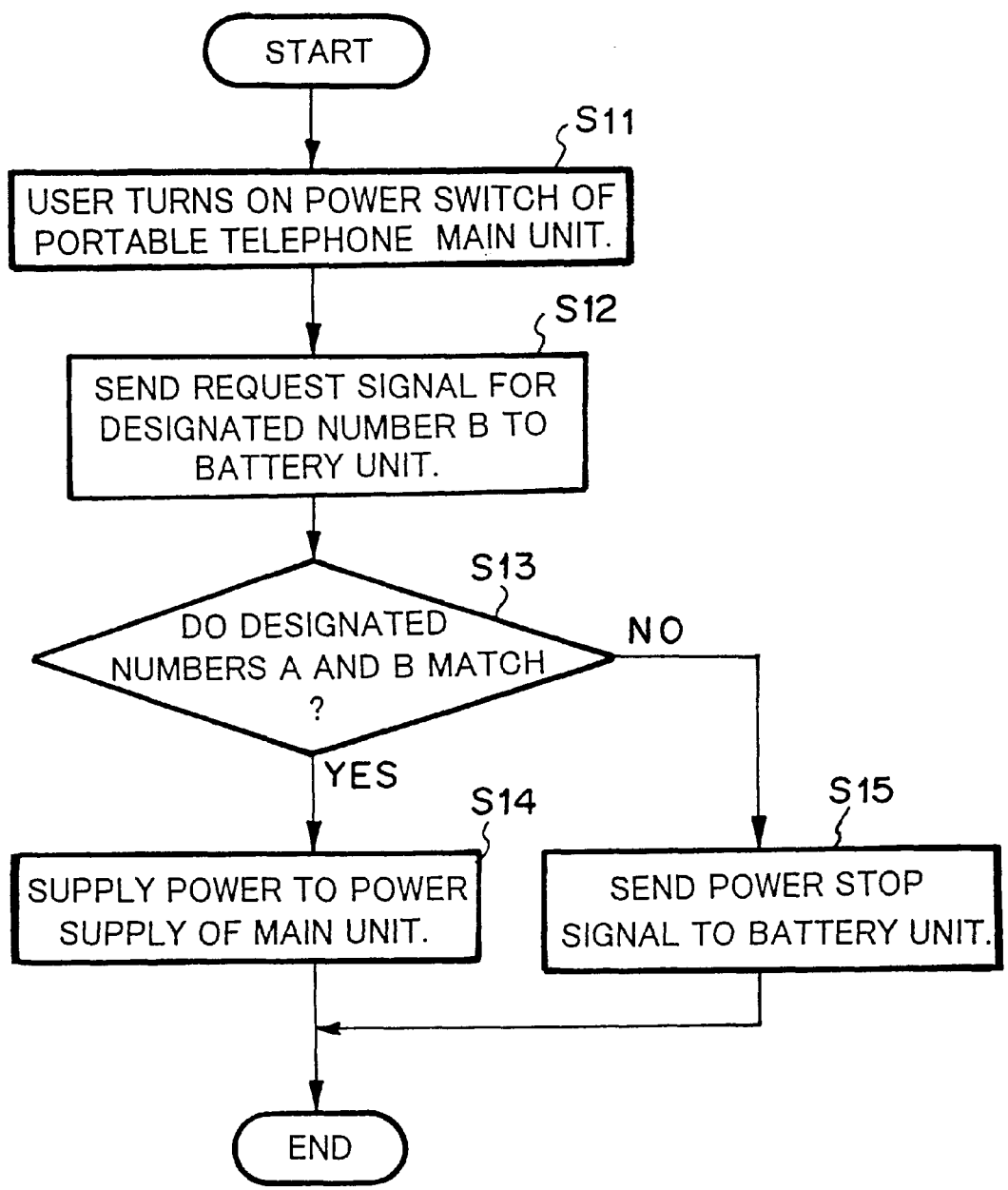
FIG. 7 is a flow chart showing an example of a process performed in a portable telephone main unit according to a fourth embodiment of the present invention.

FIG. 7 is a flow chart showing an example of the process of the portable telephone main unit according to the fourth embodiment of the present invention. Next, with reference to FIG. 1, the operation of the portable telephone main unit will be described.

Even if the power switch of the portable telephone main unit 11 is turned on, when the battery unit (31) has not been mounted thereto, the battery unit detecting circuit A (14) waits until the battery unit (31) is mounted. After the battery unit (31) is mounted, the power switch of the portable telephone unit 11 may be turned on (at step S11). In any case, the battery unit detecting circuit A (14) detects that the battery unit (31) has been mounted, causes the switch A (19) to be closed through the OR circuit A (20), and supplies power from the backup battery (18) to to the security checking circuit A (27). Thereafter, the comparing circuit A (15) sends a request signal for the designated number B to the battery unit (31) (at step S12). After the comparing circuit A (15) receives the designated number B from the battery unit (31), when the designated number B and the designated number A match (at step S13), the main unit (11) causes the switch B (37) connected to the secondary battery (32) of the battery unit (31) to be turned on and the secondary battery (32) to supply power to the power supply (12) of the main unit (11) (at step S14). When the designated number B and the designated number A do not match, the main unit (11) does not send the start signal, but does send the stop signal. Thus, the OR circuit B does not operate. Consequently, since the switch B (37) is kept in the OFF state, the battery unit (31) does not supply power to the main unit (11) (at step S15). Alternatively, with the stop signal, the main unit (11), may inform the user that the mounted battery unit (31) is different from the battery unit (31) with the designated number.

Figure 8:
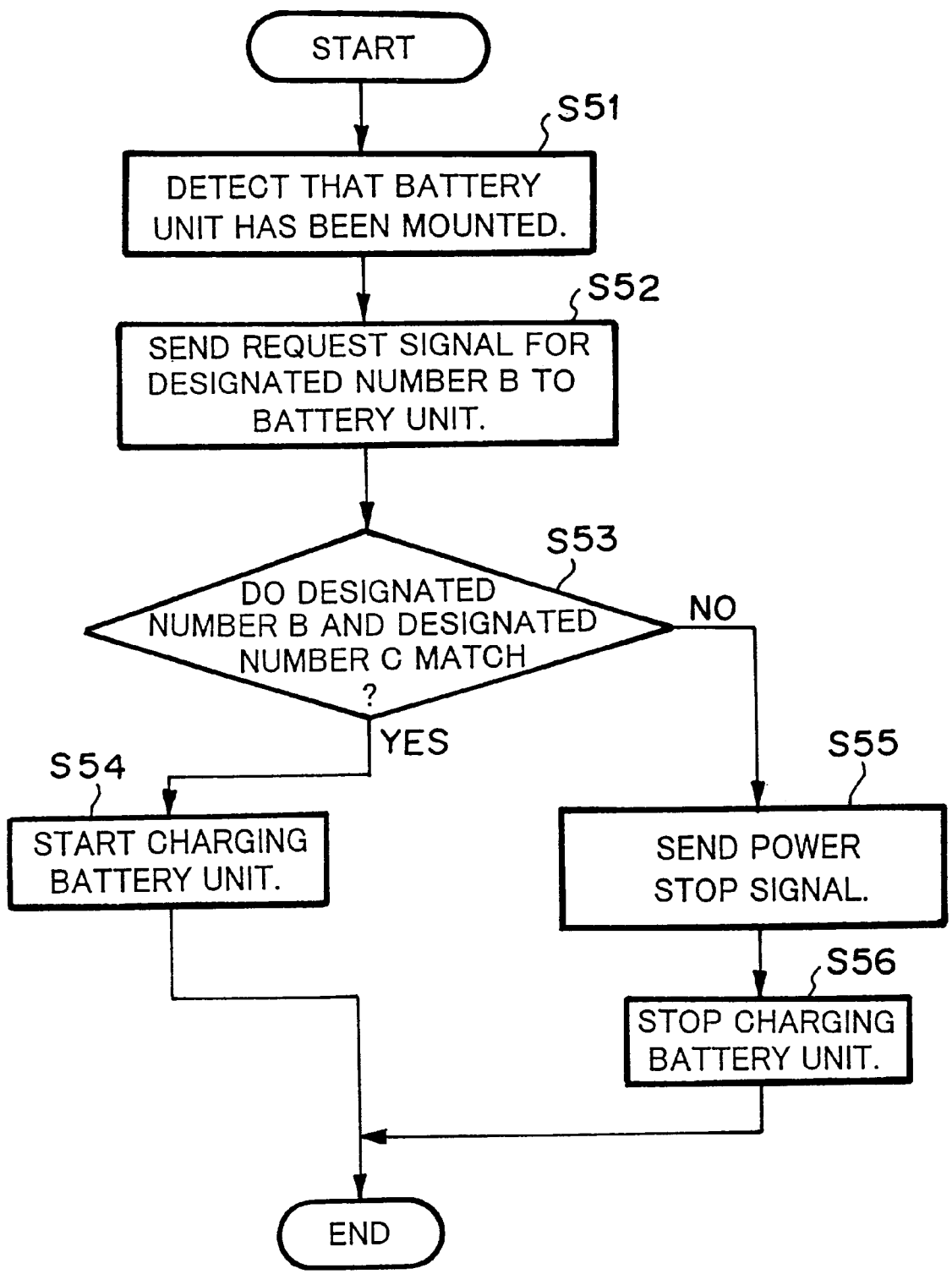
FIG. 8 is a flow chart showing an example of a process performed in a battery charger according to the fourth embodiment of the present invention.

FIG. 8 is a flow chart showing an example of the process of the battery charger according to the fourth embodiment of the present invention.

When the battery charger (51) detects that the battery unit (31) has been mounted through the charging terminal block (53) (at step S51), the battery charger (51) sends a request signal for the designated number B to the battery unit (31) (at step S52). Thereafter, the battery charger (51) reads a signal representing the designated number B received from the battery unit (31). When the designated number B and the designated number C match (at step S53), the battery charger (51) starts charging the battery unit (31) (at step S54). When the designated number B and the designated number C do not match, the stop signal sending circuit C or the start signal sending circuit C (57) that also functions as the stop signal sending circuit sends a power stop signal to the battery unit (31) (at step S55). Since the OR circuit B (40) does not function when the stop signal is sent, the switch B (37) is kept in the OFF state and thereby the battery charger (51) stops charging the battery unit (31).

Figure 9:
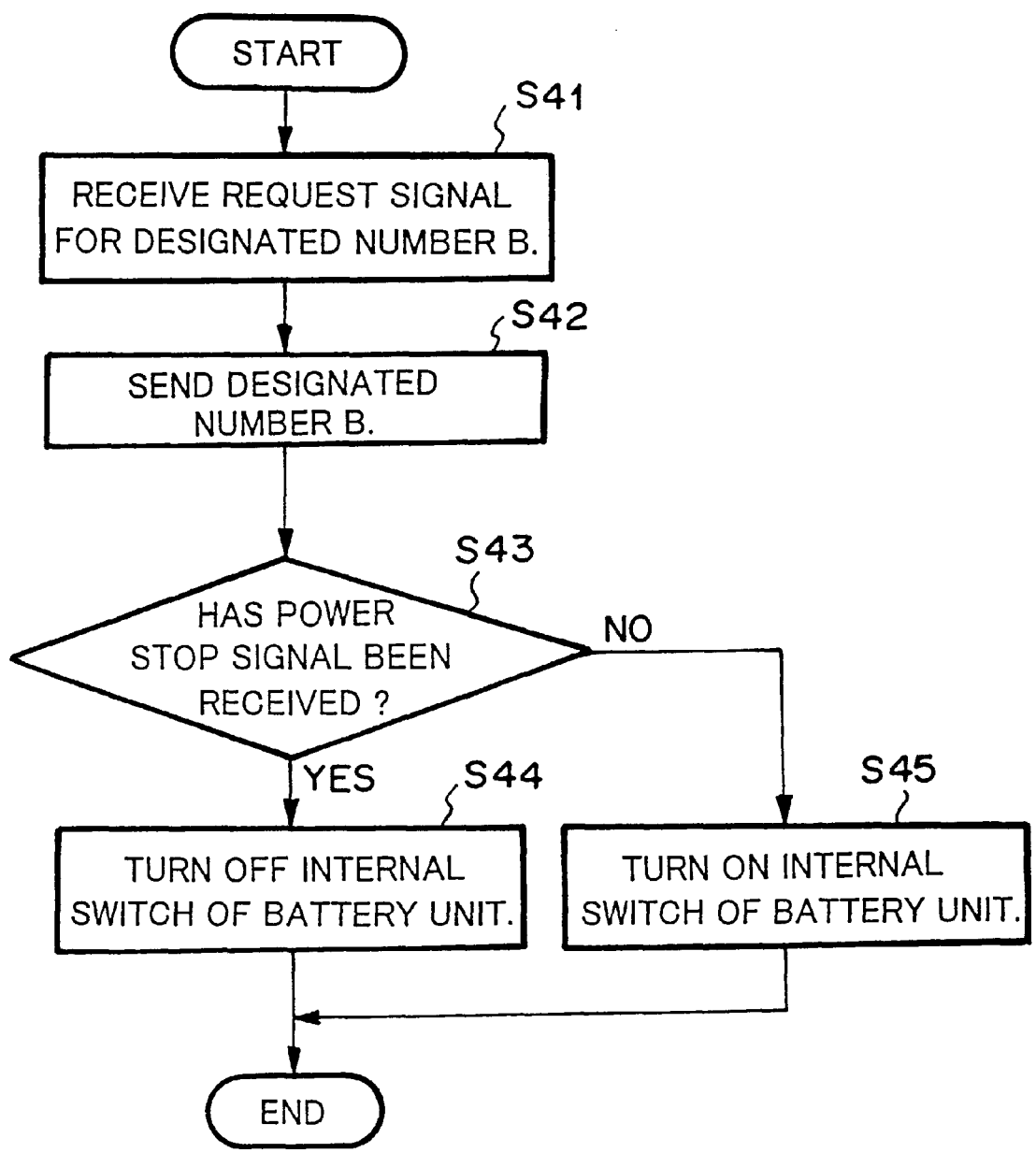
FIG. 9 is a flow chart showing an example of a process performed in a battery unit according to the fourth embodiment of the present invention.

FIG. 9 is a flow chart showing an example of the process of the battery unit according to the fourth embodiment of the present invention. With reference to FIGS. 2 and 3, the operation of the battery unit will be described.

The storing memory B (36) of the battery unit (31) stores a designated number B. When the battery unit (31) receives relevant designated number request signals from the portable telephone main unit (11) and the battery charger (51) (at step S41), the battery unit (31) sends a signal representing the designated number B to the main unit (11) and the battery charger (51) (at step S42). When the portable telephone main unit (11) and the battery charger (51) send power stop signals to the battery unit (31) (at step S43), the battery unit (31) turns off the switch B (37) and thereby stops supplying power to the main unit (11). Alternatively, the battery charger (51) does not supply power to the battery unit (31). When the battery unit (31) does not receive the stop signal, the battery unit (31) receives a start signal. When the battery unit (31) receives the start signal, the OR circuit 40 causes the switch B (37) to be closed and thereby the battery unit (31) supplies power to the portable telephone main unit (11). Alternatively, the battery charger (51) supplies power to the battery unit (31) (at step S45). When the battery unit (31) receives neither a stop signal nor a start signal, the battery unit (31) determines that the portable telephone main unit (11) and/or the battery charger (51) is damaged. Thus, the switch B (37) is kept open and thereby power consumption is prevented.

The structure of the fourth embodiment can be easily accomplished by modifying the structures of the other embodiments. Thus, the description of the structure of the fourth embodiment will be omitted. According to the fourth embodiment of the present invention, with the stop signal, the operations of the portable telephone main unit (11), the battery unit (31), and the battery charger (51) can be assured. In addition, the power consumption of the battery unit (31) can be minimized.

Fifth Embodiment

Alternatively, a battery unit may have a collation function for identification information. In the above-described embodiments, the main unit and the battery charger include the designated number comparing circuits A and C, respectively. However, a comparing circuit may be provided in the battery unit instead. In this case, when a portable telephone main unit, a battery unit, and a battery charger are structured as a set, since only the battery unit has the comparing circuit, the cost of the system is decreased. In addition, in the portable telephone main unit and the battery charger, the respective designated number sending circuits send the designated number A and the designated number B, respectively, to the battery unit. The comparing circuit of the battery unit compares the designated number thereof with the designated numbers A and B and sends the compared results to the start signal sending circuits A and C of the portable telephone main unit and the battery charger. In accordance with the compared results, the portable telephone main unit and the battery charger send the start signals and/or the stop signals to the battery unit. Thus, the switch B is opened or closed. In another alternative start signal sending circuits A and C may be disposed in the battery unit. In this case, the switch B can be always turned on with a simple modification thereof. Thus, the security of the system slightly deteriorates.

Sixth Embodiment

Figure 10:
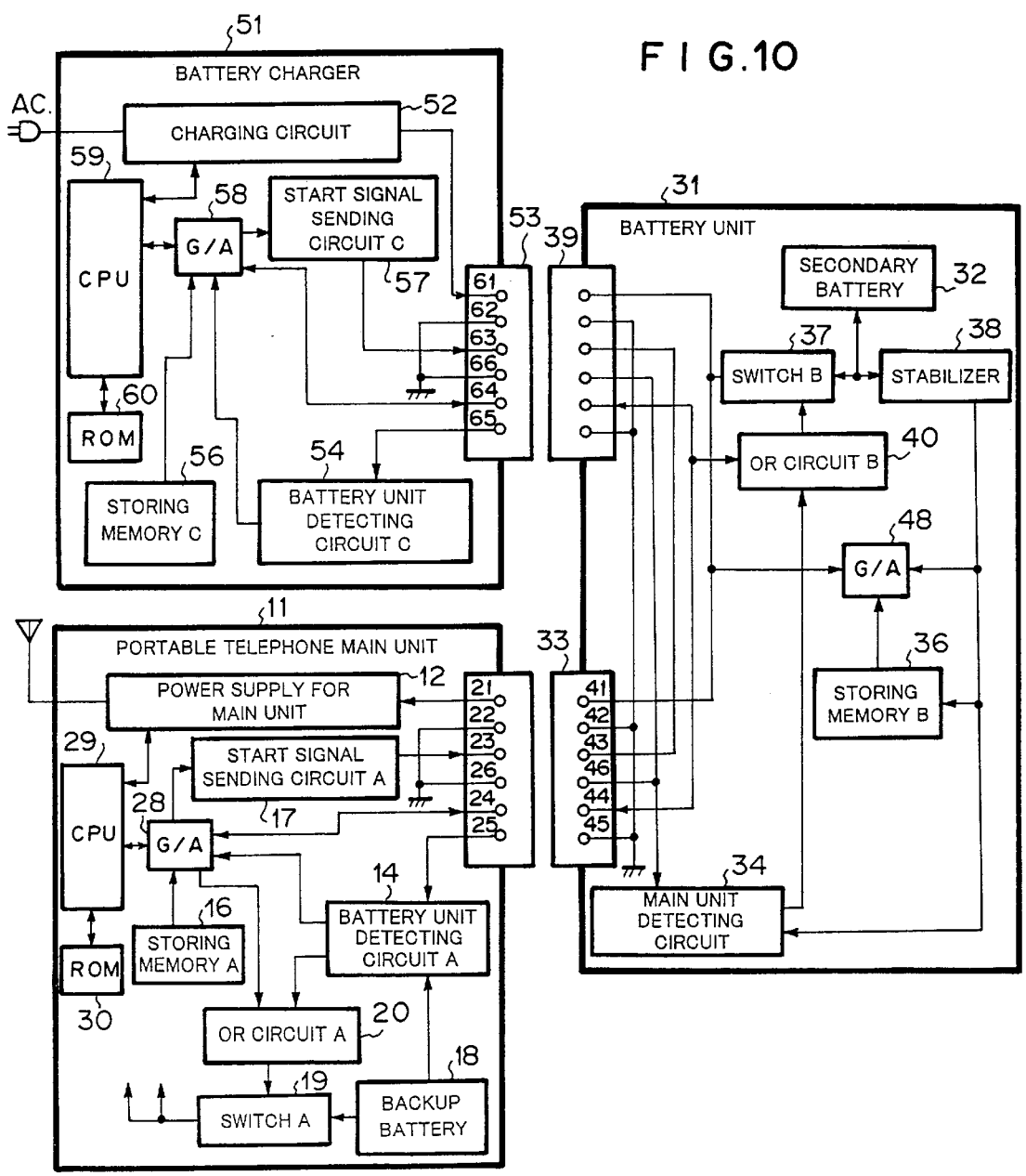
FIG. 10 is a block diagram showing the structures and connections of a portable telephone main unit, a battery unit, and a battery charger according to a sixth embodiment of the present invention.

FIG. 10 is a block diagram showing a sixth embodiment of the present invention. Referring to FIG. 10, storing memories A, B, and C, a comparing circuit A (15), a comparing circuit C (55), and peripheral circuits thereof will be described. Referring to FIG. 10, a portable telephone main unit (11) comprises a gate array (G/A) (28), a CPU (29), and a ROM (30). The G/A (28) has the same function as the comparing circuit A (15). The CPU (29) controls the entire portable telephone main unit (11). The ROM (30) stores a program that causes the CPU (29) to operate. A battery unit (31) has a G/A (48) that has the same function as the designated number sending circuit (35). A battery charger (51) has a G/A (58) that has the same function as the comparing circuit C (55). The G/A (58) receives a signal from the battery unit detecting circuit C and sends the signal to the start signal sending circuit A (17). For simplicity, in FIG. 10, similar portions to those of the first embodiment are denoted by similar reference numerals and their description will be omitted.

In FIG. 10, when the battery unit (31) is mounted to the portable telephone main unit (11), the battery unit detecting circuit A (14) sends a detection signal to the G/A (28) of the battery unit detecting circuit A (14). The G/A (28) sends an interrupt signal to the CPU (29). The CPU (29) determines whether or not a designated number [1] and a designated number [2] match.

The CPU (29) sends a designated number send request to the (48) (equivalent to the designated number sending circuit (35)) of the battery unit (31) corresponding to the program stored in the ROM (30). The G/A (48) sends the designated number [2] stored in the storing memory B (36). The G/A (28) (equivalent to the comparing circuit A (15)) and the CPU (29) receive data that represents the designated number [2] and compares the designated number [2] and the designated number [1] stored in the storing memory A (16). When these designated signals match, the CPU (29) sends a start signal send request to the start signal sending circuit A (17). On the other hand, when these designated numbers do not match, the CPU (29) does not send a start signal send request to the start signal sending circuit A (17). Instead, the CPU (29) sends a control signal to the OR circuit A (20). The OR circuit A (20) causes the switch A (19) to be open. Thereafter, the same process as that of the first embodiment is performed.

Next, the relation between the battery charger (51) and the battery unit (31) will be described. When the battery unit (31) is mounted to the battery charger (51), the battery unit detecting circuit C (54) sends a detection signal to the G/A (58) of the comparing circuit C (55). The G/A (58) sends an interrupt signal to the CPU (59). The CPU (59) determines whether or not the designated number [3] and the designated number [2] match.

The CPU (59) sends a designated number send request to the G/A (48) (equivalent to the designated number sending circuit (35)) of the battery unit (31) corresponding to the program stored in the ROM (60). The G/A (48) sends the designated number [2] stored in the storing memory B (36). The G/A (58) (equivalent to the comparing circuit C (55)) and the CPU (59) receive data that represents the designated number [2] and compares the designated number [2] and the designated number [3] stored in the storing memory C (56). When these designated numbers match, the CPU (59) sends a start signal send request signal to the start signal sending circuit C (57). When these designated numbers do not match, the CPU (59) does not send a start signal send request signal to the start signal sending circuit C (57). Thus, the CPU (59) causes the battery charger (51) to stop charging the battery unit (31). Thereafter, the same process as that of the first embodiment is performed.

In the sixth embodiment, each of the designated numbers [1], [2], and [3] is composed of three bytes. The designated numbers [1], [2], and [3] are compared at addresses 01 to 03 of the storing memories A, B, and C. In Table 1, one designated number ABCDEF corresponds to three addresses.

TABLE 1

| Storing memory A (16) | | Storing memory B (36) | | Storing memory C (56) | |
|---|---|---|---|---|---|
| Address | Data | Address | Data | Address | Data |
| 01 | AB h | 01 | AB h | 01 | AB h |
| 02 | CD h | 02 | CD h | 02 | CD h |
| 03 | EF h | 03 | EF h | 03 | EF h |

In Table 1, the designated numbers stored in the storing memories A, B, and C are the same. Thus, the security is improved. However, to further improve the security, the designated numbers stored in the storing memories A, B, and C may be different from each other. In this case, code converting circuits are disposed at the preceding stages of the comparing circuits or G/As. The code converting circuits have, for example, data tables. Assuming that the portable telephone main unit stores a designated number A and that the battery unit stores a designated number B, when the battery unit sends the designated number B in response to a designated number send request, the code converting circuit of the portable telephone main unit converts the designated number B into the designated number A corresponding to the relevant data table. Thus, the comparing circuit or G/A can easily determine whether or not the designated numbers match. Consequently, the compared result can be quickly output.

According to the present invention, as a first effect of the present invention, even if the portable telephone main unit is stolen, the communication time is restricted. Thus, the loss to the owner of the portable telephone main unit can be minimized.

In other words, even if the thief illegally uses the portable telephone main unit, unless he or she steals the battery charger and the battery unit that are configured as a set along with the portable telephone unit, the secondary battery cannot be charged. Thus, the thief cannot use the portable telephone main unit after the power of the battery runs out.

As a second effect of the present invention, the user does not need to set a security function. Thus, even if the user does not carefully read the manual thereof, the portable telephone main unit is always protected by the security feature.

In other words, whenever the battery unit is mounted to the portable telephone main unit or to the battery charger, the validity of the combination is verified even if the user does not set the security function.

In addition, according to the present invention, since the battery unit has identification information such as a designated number, even if the battery unit is substituted with another battery unit of the same type, if the identification information of these battery units differ from each other, the substituted battery unit cannot supply power to the portable telephone main unit. With the prior art devices, when both the portable telephone main unit and the battery charger have respective identification information, if a battery unit that was charged with another battery charger is mounted to the portable telephone main unit, the portable telephone can still be used. However, according to the present invention, the portable telephone main unit would become inoperable in this situation; hence, much higher security can be accomplished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A portable telephone apparatus with a security function, the portable telephone apparatus including a portable telephone main unit, a battery unit, and a battery charger, the portable telephone apparatus comprising:

first detecting and processing means for determining whether or not identification information of the portable telephone main unit and identification information of the battery unit that supplies power to the portable telephone main unit match and for supplying the power from the battery unit to the portable telephone main unit when the identification information of the portable telephone main unit and the identification information of the battery unit match; and second detecting and processing means for determining whether or not identification information of the battery unit for use with the portable telephone main unit and identification information of the battery charger that charges the battery unit match and for causing the battery charger to supply power to the battery unit when the identification information of the battery unit and the identification information of the battery charger match.

2. The portable telephone apparatus as set forth in claim 1, wherein the match of the identification information is the match of designated numbers stored in respective storing memories of the portable telephone main unit, the battery charger, and the battery unit.

3. A portable telephone apparatus comprising:

a portable telephone main unit;

a battery charger and a rechargeable battery unit, the portable telephone main unit, the battery charger, and the battery unit are structured as a discrete set and each includes identification information which is unique to that particular discrete set, means for allowing the battery unit to supply a charging current to the portable telephone main unit or the battery charger to supply a charging current to the battery unit corresponding to a start signal that is received from the portable telephone main unit or the battery charger when the identification information of the portable telephone main unit or the battery charger and the identification information of the battery unit match.

4. The portable telephone apparatus as set forth in claim 3, wherein the match of the identification information is the match of designated numbers stored in respective storing memories of the portable telephone main unit, the battery charger, and the battery unit.

5. A portable telephone apparatus comprising a portable telephone main unit;

a battery unit; the battery unit having a rechargeable battery as a power supple of the portable telephone main unit and a battery charger, the battery charger for charging the battery, the portable telephone main unit, the battery unit, and the battery charger being structured as a discrete set and having first, second, and third designated identification numbers, respectively, that are the same within the set, wherein the designated identification numbers differ from the designated identification numbers of any other set of corresponding portable telephone main units, battery units and battery chargers, wherein the portable telephone main unit comprises:

a storing memory A for storing the first designated identification number;

a battery unit detecting circuit A for detecting whether or not the battery unit has been mounted;

a comparing circuit A for sending a request for the second designated identification number to the battery unit and for comparing the second designated identification number received from the battery unit and the first designated identification number stored in said storing memory A;

an OR circuit A for performing an OR operation between a control signal received from said comparing circuit A and a control signal received from said battery unit detecting circuit A;

a start signal sending circuit A for sending to the battery unit a start signal that causes the battery unit to start supplying power when the second designated identification number of the battery unit and the first designated identification number of said storing memory A match;

a battery terminal block for receiving power from the battery unit and for exchanging data with the battery unit as an interface (I/F);

a backup battery for causing said battery unit detecting circuit A, said storing memory A, said start signal sending circuit A, said comparing circuit A, said OR circuit A, and said battery terminal block to operate even if power is not supplied to the portable telephone main unit; and a switch A for turning on and off the power supplied from said backup battery.

6. The portable telephone apparatus as set forth in claim 5, wherein the battery unit is disposed in the portable telephone main unit.

7. The portable telephone apparatus as set forth in claim 5, wherein the battery charger is disposed in the portable telephone main unit.

8. A portable telephone apparatus comprising:

a portable telephone main unit;

a battery unit; the battery unit having a rechargeable battery as a power supply of the portable telephone main unit and a battery charger, the battery charger for charging the battery, the portable telephone main unit, the battery unit, and the battery charger being structured as a discrete set and having first, second, and third designated identification numbers, respectively, that are the same within the set, the designated identification numbers differ from the designated identification numbers of any other set of corresponding portable telephone main units, battery units, and battery chargers, wherein the battery unit comprises:

the rechargeable battery for storing electrical charge to be supplied as power to the portable telephone main unit;

a storing memory B for storing the second designated identification number;

a main unit detecting circuit for detecting whether or not the battery unit has been connected to the portable telephone main unit or the battery charger;

a designated identification number sending circuit for sending the second designated identification number to the portable telephone main unit;

a switch B for closing a power line to the portable telephone main unit in response to a signal received from a start signal sending circuit A of the portable telephone main unit when the second designated identification number and the first designated identification number match;

an OR circuit B for performing an OR operation between the signal received from the start signal sending circuit A of the portable telephone main unit and a control signal received from said main unit detecting circuit;

a power supply terminal block for supplying power to the portable telephone main unit and for exchanging data with the portable telephone main unit as an I/F;

a charging terminal block B, connected in parallel with said power supply terminal block, for charging said secondary battery; and a stabilizer for stably supplying power for said secondary battery, said storing memory B, said main unit detecting circuit, said designated identification number sending circuit, said switch B, said OR circuit, said power supply terminal block, and said charging terminal block.

9. The portable telephone apparatus as set forth in claim 8,
wherein the battery unit is disposed in the portable telephone main unit.

10. The portable telephone apparatus as set forth in claim 8,
wherein the battery charger has been built in the portable telephone main unit.

11. The portable telephone apparatus as set forth in claim 8,
wherein the portable telephone main unit and the battery charger have respective gate arrays, CPUs, and ROMS, and
wherein the CPUs operate corresponding to programs stored in the respective ROMs.

12. A portable telephone apparatus comprising:
a portable telephone main unit;
a battery unit; the battery unit having a rechargeable battery as a power supply of the portable telephone main unit and
a battery charger, the battery charger for charging the battery,
the portable telephone main unit, the battery unit, and the battery charger being structured as a discrete set and having first, second, and third designated identification numbers, respectively, that are the same within the set wherein the designated identification numbers are different from the designated identification numbers of any other set of corresponding portable telephone main units, battery units, and battery chargers,
wherein the battery charger comprises:

a storing memory C for storing the third designated identification number;

a battery unit detecting unit C for detecting whether or not the battery unit has been mounted;

a comparing circuit C for sending a send request signal for the second designated identification number to the battery unit and for comparing the second designated identification number received from the battery unit with the third designated identification number stored in said storing memory C;

a start signal sending circuit C for sending to the battery unit a start signal for causing the battery charger to start charging the battery unit when the designated identification numbers match in said comparing circuit C; and a power line for charging the battery unit and a charging terminal block for exchanging data with the battery unit as an I/F.

13. The portable telephone apparatus as set forth in claim 12,
wherein the battery unit is disposed in the portable telephone main unit.

14. The portable telephone apparatus as set for in claim 12,
wherein the battery charger is disposed in the portable telephone main unit.

15. The portable telephone apparatus as set forth in claim 12,
wherein the portable telephone main unit and the battery charger have respective gate arrays, CPUs, and ROMs, and
wherein the CPUs operate corresponding to programs stored in the respective ROMs.

16. The portable telephone apparatus as set forth in claim 5,
wherein the portable telephone main unit and the battery charger have respective gate arrays, CPUs, and ROMs and
wherein the CPUs operate corresponding to programs stored in the respective ROMs.

17. A portable telephone apparatus with a security function, the portable telephone apparatus including a portable telephone main unit, a battery unit, and a battery charger, the portable telephone apparatus comprising:
first detecting and processing means for determining whether or not identification information of the portable telephone main unit and identification information of the battery unit that supplies power to the portable telephone main unit match; and
detecting and processing means for determining whether or not identification information of the battery unit for use with the portable telephone main unit and identification information of the battery charger that charges the battery unit match.

18. The portable telephone apparatus as set forth in claim 17, further comprising:
first power supplying means for supplying power to the portable telephone main unit when the identification information of the portable telephone main unit and the identification information of the battery unit match; and
second power supplying means for causing the battery charger to supply power to the battery unit when the identification information of the battery unit and the identification information of the battery charger match.

* * * * *